Patented Jan. 21, 1930

1,744,371

UNITED STATES PATENT OFFICE

FRITZ DRAISBACH, OF LUDWIGSHAFEN-ON-THE-RHINE, GERMANY, ASSIGNOR TO THE FIRM JOH. A. BENCKISER, CHEMISCHE FABRIK, OF LUDWIGSHAFEN-ON-THE-RHINE, GERMANY

METHOD OF SEPARATING ALKALI-EARTH METAL PHOSPHATES FROM PRIMARY ALKALI PHOSPHATE SOLUTIONS

No Drawing. Application filed February 29, 1928, Serial No. 258,132, and in Germany June 21, 1926.

My invention relates to a method for the commercial recovery of alkali metal phosphates from crude phosphates, and more particularly to the precipitation and elimination of the phosphates of the alkaline-earths from the solution finally resulting from the treatment of crude phosphates with sulfuric acid in the usual process of manufacturing soluble phosphates, and which mainly contains alkali metal phosphates.

In the said process of producing alkali metal phosphates by treating crude phosphates with sulfuric acid and neutralizing the solution by means of sodium carbonate or the like, it is known that the resulting monophosphate solutions contain more or less phosphates of the alkaline-earths and that the presence of the latter in the solution is very objectionable, if it is desired to produce pure mono-alkali-metal phosphates in an economical way.

As a result of my research I found that even in case of highly concentrated solutions of mono-alkali-metal phosphates such as solutions of mono-sodium-phosphate, mono-potassium phosphate and mono-ammonium phosphate, it is possible to convert any mono-alkaline-earth phosphates contained in the said solutions into di-alkali-earth phosphates by adding di-alkali phosphates in the calculated quantity or preferably in a quantity slightly in excess thereof, and heating the same in an autoclave at high pressure as e. g. 5 to 15 atmospheres up to temperatures between 150° and 200° C. The increased pressure requires a considerable increase in temperature. As the ionization of water alters very much with the temperature (at 156° C. it is 200 times as great as at 25° C.), then the mono alkaline earth phosphate can be hydrolytically split by it into di-alkaline earth phosphate and free phosphoric acid. The free phosphoric acid thus produced is bound by the di-alkali metal phosphate present. Thus for example the process for magnesium phosphate in a mono potassium phosphate solution—in which any alkaline earth metals can be substituted for magnesium and any of the alkali metals for potassium, can be explained by the following equations

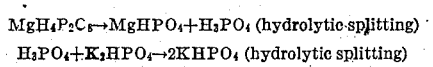

From these equations it can be seen that in order to separate 40 parts of MgO as $MgHPO_4$ 71 parts of $P_2O_5$ in the form of di-alkali phosphate must be added.

Thus for example the process for magnesium phosphate in a mono potassium phosphate solution to which any alkaline earth metals may be substituted for magnesium and any of the alkali metals for potassium, can be explained by the following equations:

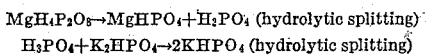

As for instance, I added a sufficient quantity of di-sodium phosphate to a solution of mono-sodium phosphate containing 470 grams of $P_2O_5$, 9 grams of CaO and 32 grams of MgO in the litre, and I then heated the same for six hours at a pressure of 8 atmospheres up to 170° C., with the result that all of the mono calcium phosphate and about 90 percent of the mono magnesium phosphate were converted into di-phosphates which are insoluble and show excellent filtering qualities so that they are easily to be separated from the alkali metal phosphate in solution. Simultaneously with the mono-earth-alkali phosphates any small quantities of the di-alkaline earth phosphates which may be present are also removed.

By this way it is possible to produce solutions of mono alkali metal phosphate entirely free from calcium phosphates and which contain only 0.4 to 0.7 parts of MgO to 100 parts of $P_2O_5$.

The present invention relates to the almost total removal of calcium oxide or magnesium oxide still remaining in the solution. Quantities of calcium oxide and magnesium oxide in mono-alkali phosphate solutions which up to the present could not be removed, and consequently many intermediate crystallizations must be carried out to obtain a pure clear soluble crystallized mono-alkali phosphate are so completely removed by the process described in the present application, that the mono-phosphate solution is absolutely free from calcium oxide and per 100 parts of $P_2O_5$ only contains 0.2 to 0.4 parts of MgO.

A particular economic invaluable advantage of the new process is that it permits even strongly concentrated solutions likewise to be completely purified from calcium oxide and MgO. Hitherto these solutions had to be considerably diluted in order to be able to carry out a purification from CaO and MgO as the solubility of the earth alkali phosphate increases with increasing concentration of the mono-alkali phosphate solution.

From the foregoing, it is believed that the advantages and novel features of my invention will be readily understood.

What I claim is:

1. The method of separating phosphates of the alkaline-earths from solutions of primary alkaline phosphates containing such alkaline-earth phosphates, consisting in adding di-alkali phosphate to the said solutions and heating the mixture at above atmospheric pressure.

2. The method of separating phosphates of the alkaline-earths from solutions of primary alkaline phosphates containing such alkaline-earth phosphates, consisting in adding di-alkali phosphate to the said solutions and heating the mixture at a pressure of between 5 and 15 atmospheres.

In testimony whereof I affix my signature.

FRITZ DRAISBACH.